United States Patent [19]

Kasselman

[11] Patent Number: 5,069,167
[45] Date of Patent: Dec. 3, 1991

[54] PET FOOD CONTAINER

[76] Inventor: Leslie L. Kasselman, 11550 Sage Canyon, Houston, Tex. 77089

[21] Appl. No.: 610,577

[22] Filed: Nov. 8, 1990

[51] Int. Cl.$^5$ .............................................. A01K 5/01
[52] U.S. Cl. ..................................................... 119/61
[58] Field of Search ......................... 119/61, 72, 51.05

[56] References Cited

U.S. PATENT DOCUMENTS

| | | | |
|---|---|---|---|
| 3,441,003 | 4/1969 | Du Mond et al. ..................... | 119/61 |
| 4,953,506 | 9/1990 | Sanders .................................. | 119/61 |
| 4,981,108 | 1/1991 | Faeroe .................................... | 119/61 |

Primary Examiner—John G. Weiss
Attorney, Agent, or Firm—Harrison & Egbert

[57] ABSTRACT

A pet food container having a dish member with an outwardly angled side wall and a base member having a generally flat bottom surface. The dish member includes a concavity formed in an upper surface. The dish member has a connector that is formed on a bottom surface of the concavity. The base member has a raised rim extending upwardly from an outer periphery of the bottom surface. The base member has a central member for engaging the connector of the dish member. A hole is formed interior of said central member. The rim and the central member define a liquid-receiving moat in the base member. The dish member is positioned above the base member such that the angled side wall of the dish member is separated from the rim of the base member. The angled side wall has a window area formed therein so as to allow a liquid to be introduced into the moat of the base member. The window includes a ledge that is formed along a top edge of the window area. The angled side wall has a bottom edge of greater diameter than the rim of the base member.

14 Claims, 6 Drawing Sheets

PET FOOD CONTAINER

TECHNICAL FIELD

The present invention relates generally to apparatus for feeding animals. More particularly, the present invention relates to dishes or bowls for feeding pets and for preventing insects from entering the food containing area of the dish.

BACKGROUND ART

Feed trays or bowls for feeding animals are generally known. Also known are animal feeders which are comprised of two or more sections as well as bowl feeders which include means for repulsing or trapping insects seeking access to the bowl portion.

The problem of insects intruding into the feed bowls of animals is a great problem. In the southern areas of the United States, it is quite common for fire ants to crawl up the side of the feed bowl and enter into the food containing area of the feed bowl. As such, when a pet desires to eat food from his bowl, the ant may sting the mouth of the pet or otherwise injure the pet. It has been found that the stinging of an animal's mouth by an insect within the feed bowl will tend to discourage the animal from receiving food from such a feed bowl. Often, the stings of fire ants, and other insects, can be injurious and even fatal to the pet.

Prior attempts have been made of isolating the food from the insects. Unfortunately, many of these prior art attempts have been ineffective in preventing the intrusion of insects into the bowl. Also, the mechanisms used for preventing the intrusion of insects into the feed bowl have been both complicated, messy, difficult to utilize, and otherwise inconvenient. Further, and additionally, since the cost of an animal feed bowl is of concern to pet owners, it is preferable to design such an insect proof feed bowl which is not costly to manufacture or sell.

Another common problem for pet food bowls is that they are commonly knocked over, thereby spilling food or water everywhere. If the pet food bowl is of a type that is suitable for preventing insect intrusion, then the bowl is usually pushed so as to be adjacent a surface that acts as a bridge for insects. As such, it was felt to be important to design an insect-proof pet bowl that could be fixed in position.

It is an object of the present invention to provide an insect-proof pet food container that effectively prevents the intrusion of non-flying insects into the food area of a feed bowl.

It is another object of the present invention to provide a pet food container that is easy to utilize easy to assemble, and relatively clean.

It is another object of the present invention to provide such a pet food container that requires a very inexpensive manufacturing process.

It is a further object of the present invention to provide such a pet food container that allows water to be introduced without mess.

It is still another object of the present invention to provide a pet food container that can be fixed to the ground.

These and other objects and advantages of the present invention will become apparent from a reading of the attached specification and appended claims.

SUMMARY OF THE INVENTION

The present invention is a pet food container comprising a dish member having an outwardly angled side wall and a base member having a generally flat bottom surface. The dish member has a concavity formed in the upper surface. This concavity is suitable for the receipt of pet food. The dish member also has a connector that is formed on a bottom surface of the concavity. The base member has a raised rim extending upwardly from an outer periphery of the bottom surface. This base member also includes a central member that engages the connector of the dish member. The rim and the central member define a liquid-receiving moat in the base member. The dish member is positioned above the base member such that the angled side wall of the dish member is separated from the rim of the base member. Ants and other non-flying insects are prevented from entering into the concavity of the dish member by the moat. The moat prevents access to the surface of the dish member.

The angled side wall has a window area that is formed therein. This window area allows a liquid to be passed to the moat of the base member without removing the dish member from the base member. The window area opens through a bottom edge of the angled side wall so as to allow for clear viewing of the liquid level within the moat. The window area also has a ledge that is formed along a top edge. This ledge serves to deflect material from entering into the window area from the food bowl. The window area, in an alternative embodiment, includes a slotted indented surface formed therein. This slotted indented surface has a roughly V-shaped configuration extending inwardly of the side wall.

The angled side wall of the dish member has a bottom edge of greater diameter than the rim of the base member. The connector of the dish member is a collar that extends downwardly from the concavity of the dish member. The central member of the base member is a support pipe that extends upwardly from the base member. This support pipe slidingly engages an inner surface of the collar. The base further includes a hole formed therein. This hole is suitable for the receipt of a nail, stake, or other member for fixing the base member to a surface, such as the ground.

In the preferred embodiment of the present invention, the collar and the dish member are integrally formed together in an injection-molding process. The base member and the central member are also integrally formed together in an injection-molding process. All of the components of the present invention are made of an injection-molded plastic material.

The angled side wall of the present invention has a bottom edge that is separated from the top edge of the rim by a distance of one-half inch or greater.

In use, the moat of the base member contains water. The concavity of the dish member contains a pet food. The location of the moat prevents insects from ever having access to the dish member and from ever entering into the concavity containing pet food. As such, the present invention offers an inexpensive approach for the prevention of insect intrusion into the pet food dish.

DETAILED DESCRIPTION OF THE INVENTION

Figure 1:
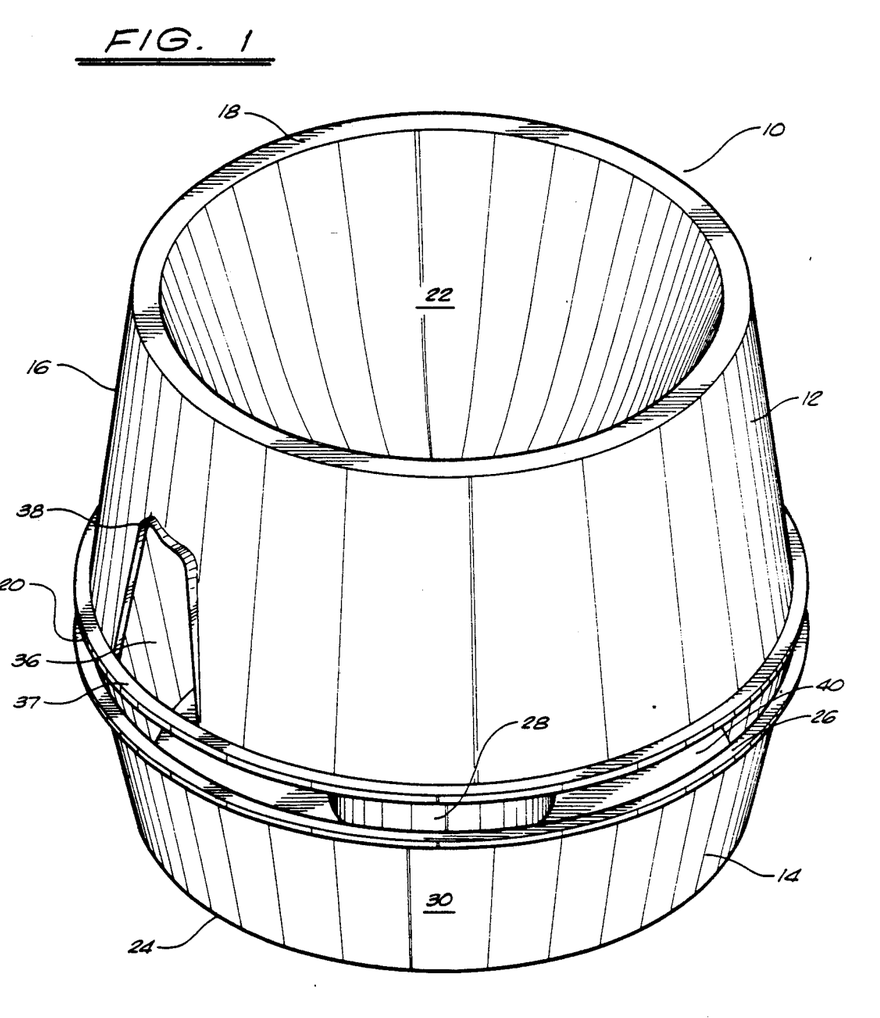
FIG. 1 is a perspective view showing the preferred embodiment of the present invention.

Referring to FIG. 1, there is shown at 10, the ant-proof pet food container in accordance with the preferred embodiment of the present invention. The pet food container 10 comprises the dish member 12 and the base member 14. Dish member 12 has an outwardly angled side wall 16 that extends from the top edge 18 to the bottom edge 20 of dish member 12. The dish member 12 also includes a concavity 22 that is formed in the upper surface 18 of dish member 12. The concavity 22 is suitable for the receipt of pet food. Concavity 22 has a generally semi-spherical shape that extends downwardly into the dish member 12. In essence, the concavity 12 forms the dish of the pet food container 10 of the present invention.

The base member 14 has a generally flat bottom surface 24. The base member 14 also has a raised rim 26 that extends upwardly from the outer periphery of bottom surface 24. A central member 28 extends upwardly from the interior of base member 14. Central member 28 receives the connector of dish member 12 so as to join the dish member 12 to the base member 14. The area between the rim 26 and the central member 28 within the base member 14 acts as a liquid-receiving moat. The dish member 12 is positioned above the base member 14 such that the angled side wall 16 of dish member 12 is separated from the rim 26 of the base member 14.

Specifically, it can be seen that the base member has a body portion 30. The base member 14 has a bottom surface 24 that is generally flat and suitable for placement on any level surface.

Of particular note is the inclusion of a window area 36 which is formed within the angled side wall 16 of dish member 12. This window area 36 has a generally semicircular shape that extends near the bottom edge 20 of the angled side wall 16 The window area 36 also has a ledge 38 that is formed along the top edge of the window area 36. This ledge serves to deflect materials from passing into the window area 36. Window area 36 is suitable for allowing a liquid to be poured therethrough and into the moat area 40 of the base member 14. A thin strip 37 is formed below window area 36. This thin strip 37 serves to stabilize the shape of dish member 12 and to assist in the molding process.

The bottom edge 20 of the angled side wall 16 of the dish member 12 has a greater diameter than the diameter of the rim 26 of base member 12. The bottom edge 20 of the dish member 12 is separated by a distance of one-half inch or greater from the rim 26 of base member 14 The dish member 12 is suspended in a level condition above the base member 14 by the use of the central member 28 and a connector (not shown). The connector is attached to the bottom side of the concavity 22 of dish member 12.

Figure 2:
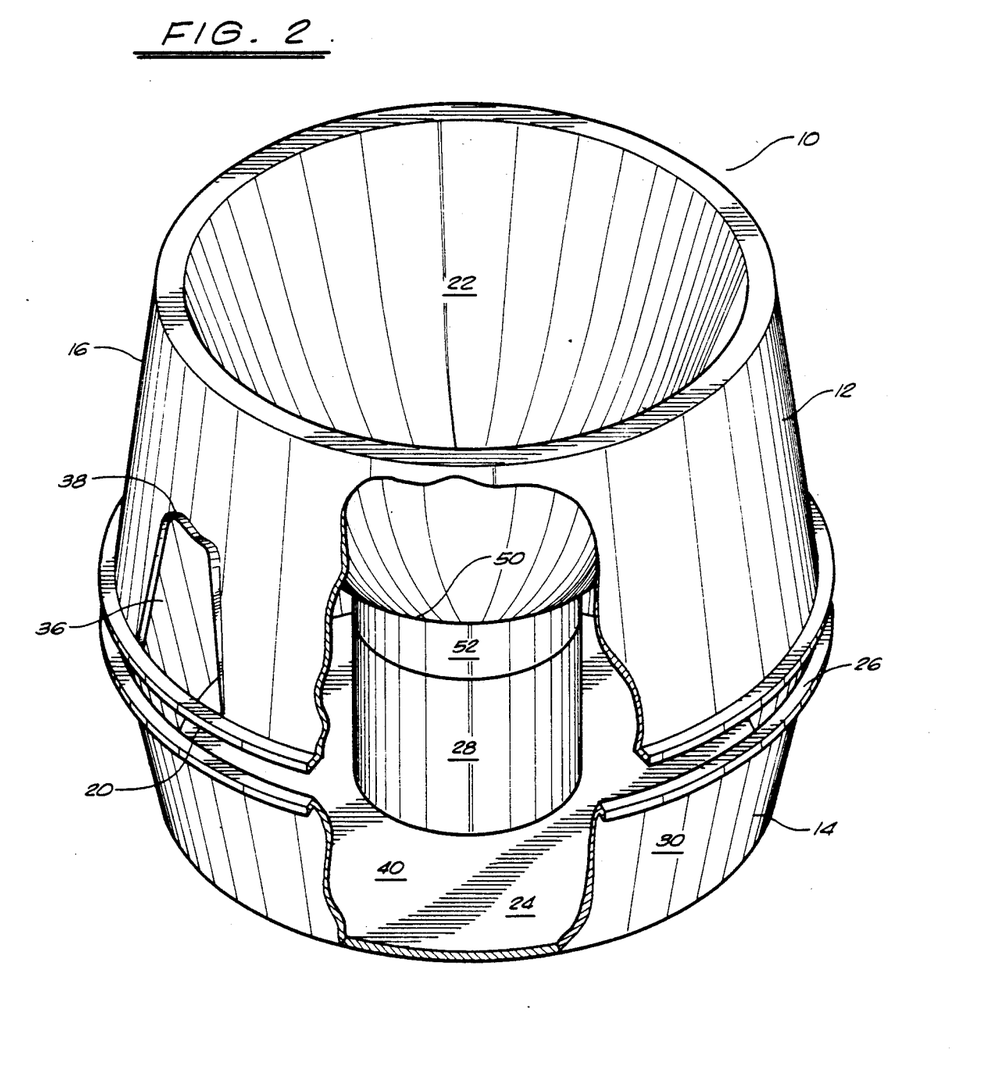
FIG. 2 is a cutaway perspective view of the present invention showing, in particular, the interior configuration of the present invention.

FIG. 2 shows a cutaway view of the configuration of the pet food container 10 in accordance with the preferred embodiment of the present invention. It can be seen that the dish member 12 includes the concavity 22 formed in its upper surface. The concavity extends downwardly into the dish member 12 so as to form a bottom surface at 50 on the interior of the angled walls 16 of dish member 12. The angled wall is a generally thin section of plastic that extend downwardly, in the form of an apron, around the concavity 22. The bottom edge 20 extends lower than the bottom surface 50 of the concavity 22. As can be seen, a connector 52 is connected to the bottom edge 50 of the concavity 22. The connector 52 is suitable for sliding engagement with the exterior surface of the central member 28 of the base member 14. Connector 52 is a collar of annular configuration that is centrally mounted to the base 50 of the concavity 22 The collar 52 will extend downwardly even with lower edge 20 of the angled side walls 16 of dish member 12.

In FIG. 2, it can be seen that the base member includes the rim 26. Rim 26 forms the upper edge of the base member 14. Base member 14 has a smooth outer surface. In the cutaway view, it can be seen that the central member 28 is centrally located along the bottom surface 24. The area between the central member 28 and the inner walls of the lower body portion 30 and the upper body portion 32 form the moat 40. Moat 40 is suitable for the receipt of a liquid, such as water.

Also in FIG. 2, it can be seen how the window area 36 opens to the interior of the base member 14. As such, water can easily be poured through the window area 36 so as to fill the moat 40 of the base member 14. Also, a simple viewing through the window area 36 can inform the user as to whether the moat area 40 has a suitable level of water for the prevention of insect intrusion.

Figure 3:
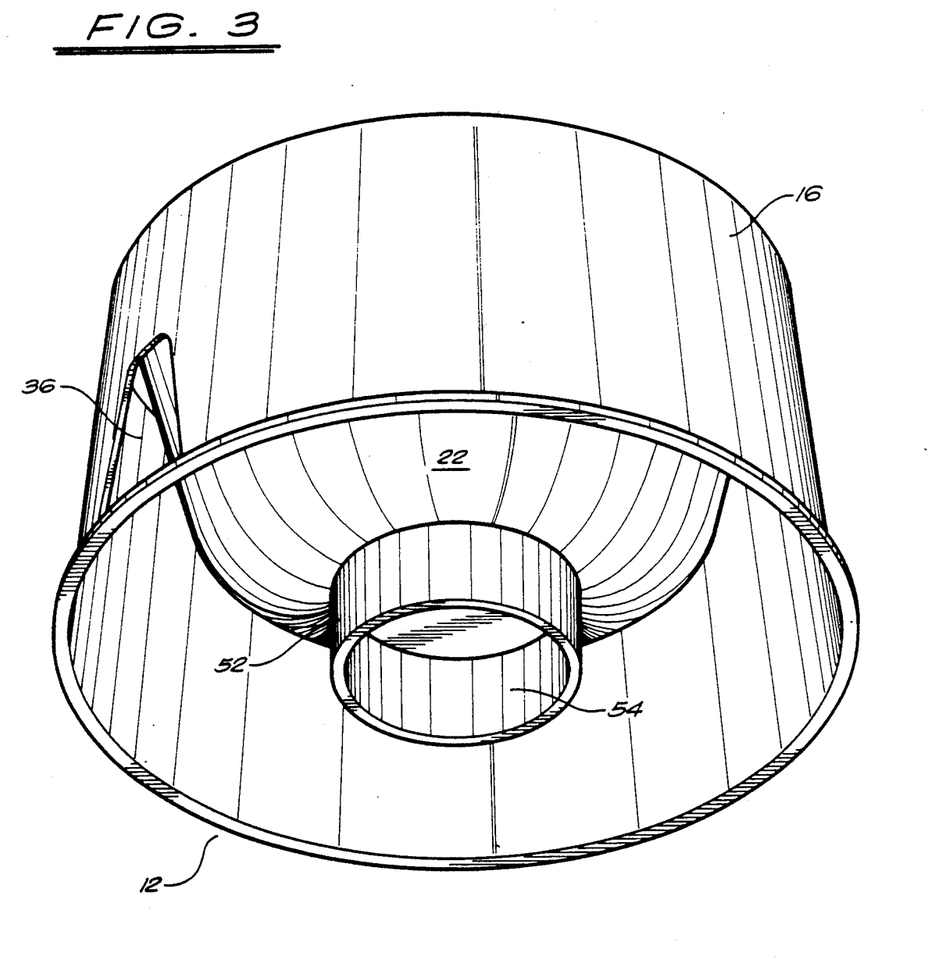
FIG. 3 is a perspective view showing the underside of the dish member in accordance with the preferred embodiment of the present invention.

FIG. 3 is an isolated view showing the dish member 12 as separated from the pet food container 10 of the present invention. Dish member 12 is shown with angled wall 16, with concavity 22, and with connector 52. In FIG. 3, it can be seen, in particular, that the connector 52 is a collar member having an open interior 54. The open interior 54 is suitable for the sliding receipt of the central member 28 of the base member 14. The window area 36 is formed so as to open along the bottom edge 20 of the dish member 12. The dish member 12 and the connector 52 are integrally formed together in an injection-molding process. It was found that the configuration of the dish member 12 is suitable for a single mold arrangement in an injection molding machine. As such, the cost of producing the dish member 12 is relatively low. The components of dish member 12 are integrally molded together. There is no need for assembly processes, adhesion processes, or other mechanical or manual means for the creation of the dish member 12. As such, a large quantity of dish members 12 can be created in a single molding operation. Each of the dish members is produced at a minimal cost.

Figure 4:
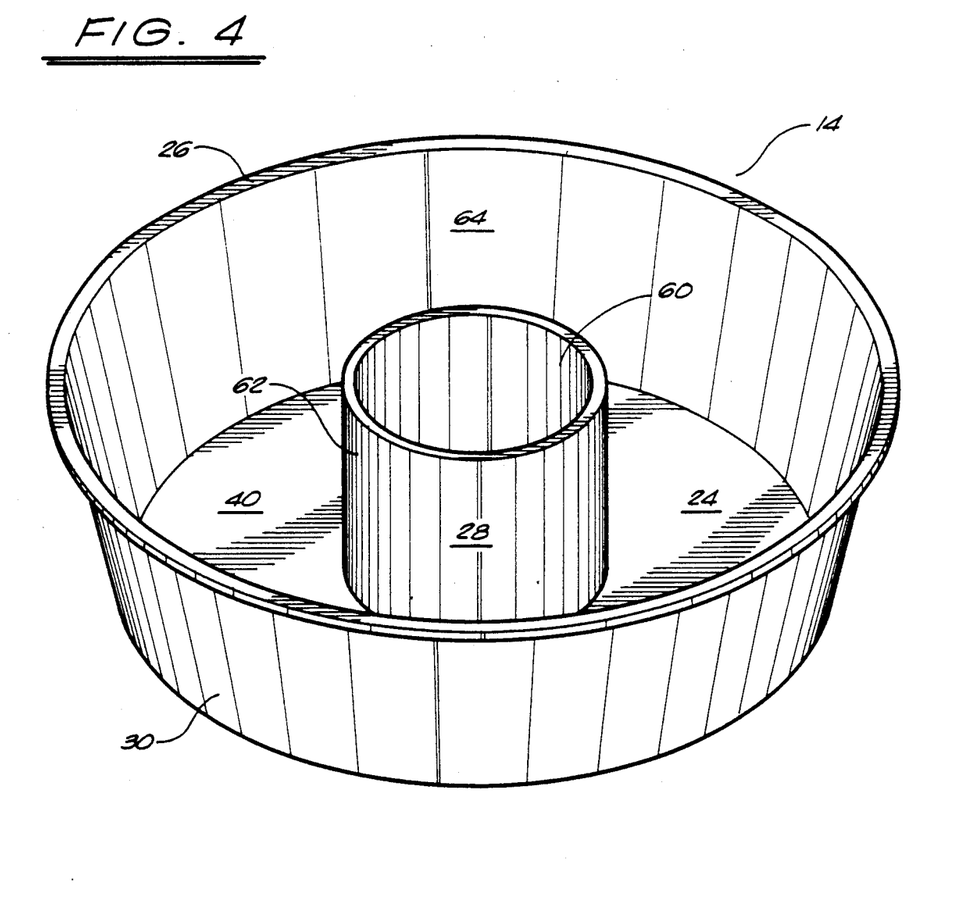
FIG. 4 is a perspective view showing the top side of the base member in accordance with the preferred embodiment of the present invention.

FIG. 4 shows an isolated view of the base member 14. It can be seen that the base member includes the bottom surface 24, body portion 30, rim 26, and central member 28. As described herein previously, the central member 28 extends upwardly from the center of the bottom surface 24 of base member 14. The central member 28 has a cylindrical shape and an open interior 60. The exterior 62 of central member 28 engages the interior 54 of collar 52 of the dish member 12. As such, the dish member 12 can easily slide into position onto the central member 28 of base member 14. The moat 40 serves to receive the liquid. The liquid is retained by the interior wall 64 of base member 14.

Of particular note, the base member 14 can be formed in a single injection-molding process. A single mold for an injection-molding machine is suitable for the preparation of the base member 14. No assembly is required so as to position the central member 28 on the bottom surface 24 of the base member 14. By using injection-molding and the single molding process the base member 14 can be created with minimal cost, minimal material, and no assembly. In fact, the dish member 12 and the base member 14 can be formed in a single mold. After they are removed from the mold, then the dish member 12 can be slidably positioned onto the central member 28 of the base member 14. In this manner, the preferred embodiment of the present invention, as illustrated at 10 in FIGS. 1 and 2, can be assembled.

Figure 5:
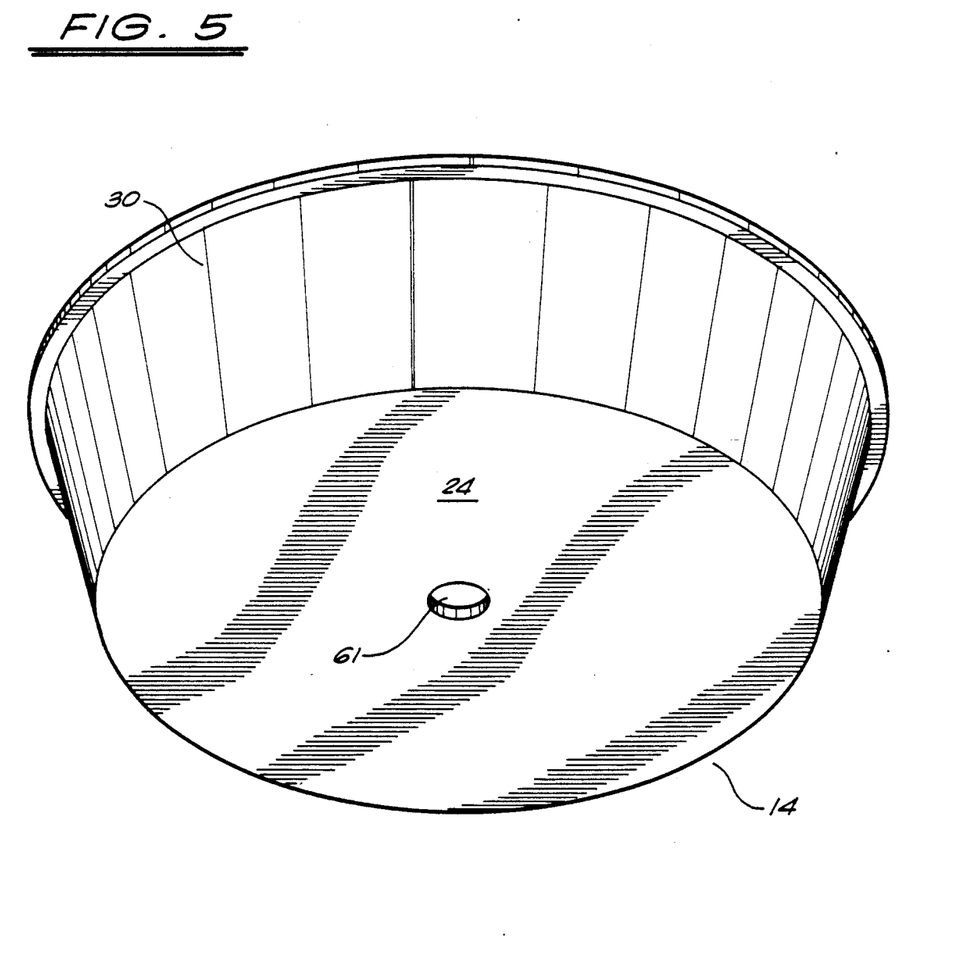
FIG. 5 is a perspective view showing the bottom side of the base member in accordance with the preferred embodiment of the present invention.

FIG. 5 shows a bottom perspective view of the base member 14 showing in particular, the body portion 50 and bottom surface 24. Of particular note in FIG. 5 is the inclusion of a hole 61 that is formed centrally in the bottom surface 24. Hole 61 extends through the thickness of body surface 24 so as to open to the interior of the collar 52. Hole 61 should be of a suitable size so as to allow a stake, or other rigid member, to be inserted therethrough. In use, the hole 61 receives a stake so as to allow the base member 14 to be rigidly attached to a surface, such as the ground. The stake can be inserted by hand, hammered, or otherwise passed through the hole 61. Once the stake is inserted through hole 61, and the base member 14 fastened to the ground, then it becomes very difficult to move, dislodge, tip over, or otherwise displace the pet food container 10 of the present invention.

Figure 6:
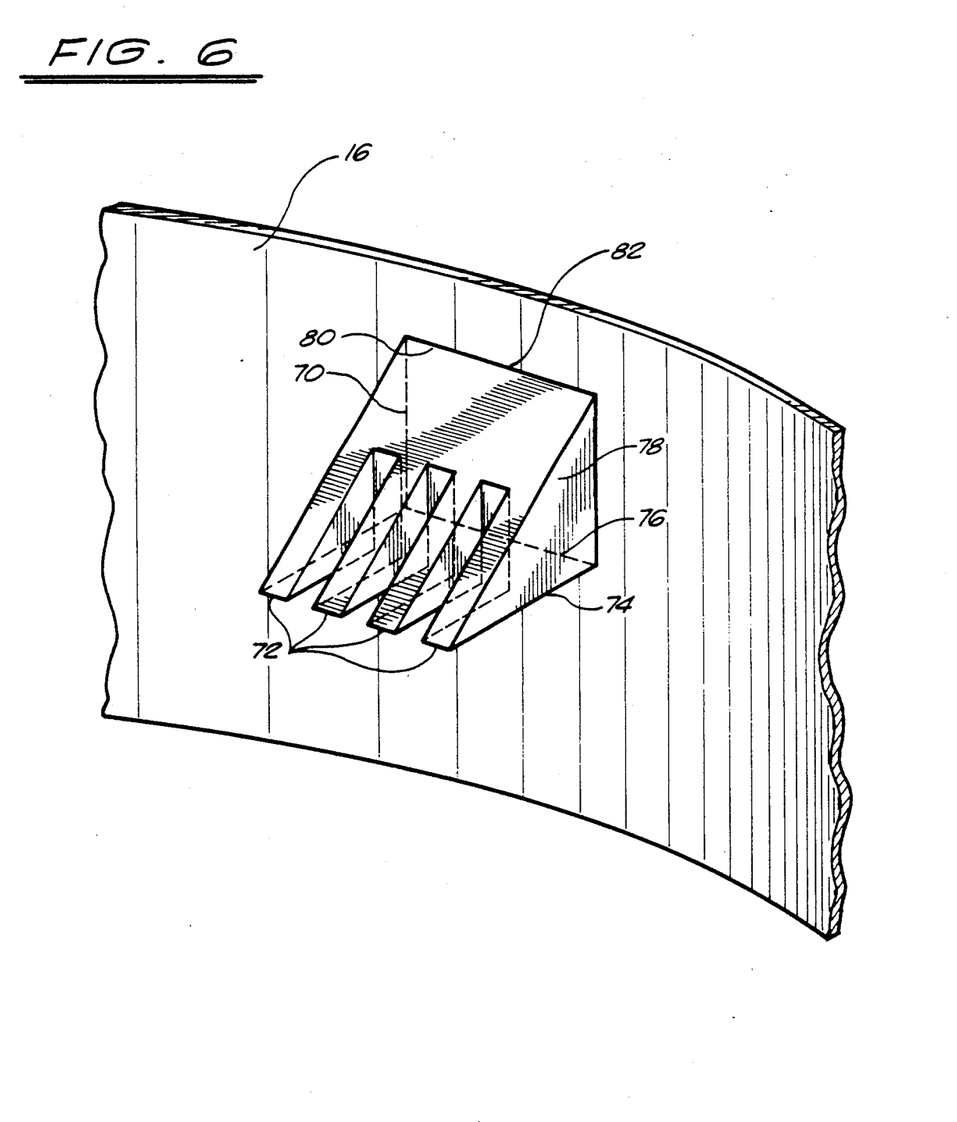
FIG. 6 is a perspective view showing the configuration of an alternative embodiment of the present invention.

FIG. 6 shows an alternative embodiment of the present invention. Essentially, in FIG. 6, there is shown the angled side wall 16 of the dish member 12. In place of the window area 36, as shown in the preferred embodiment, the alternative embodiment illustrated in FIG. 6 shows a slotted indented surface 70 which extends into the interior of the dish member 12. It can be seen that a plurality of slots 72 are formed in the surface 70. This slotted indented surface 70 has a V-shaped configuration. The bottom end 74 is connected to the bottom edge 76 of window 78. The top end 80 is connected to the top edge 82 of window 78. In the embodiment illustrated in FIG. 2, the slotted indented surface 70 serves to prevent the intrusion of food, or other materials, into the moat 40 of the base member 14. It also serves to prevent access to the moat 40 by the pet.

The present invention achieves a number of advantages not found in prior pet food containers. Most importantly, the configuration of the present invention allows for manufacture at minimal cost. Since the pet food bowl is a relatively simple item, consumers are not accustomed to paying high prices for such a pet food bowl. Complex arrangements for the prevention of ant intrusion into the pet food containers have required relatively expensive molding procedures in the past. It is a goal to minimize the cost of the molding techniques used for the manufacture of the present invention. By the simple two-piece construction of the present invention, a simple mold can be created that will allow for the production of the entire pet food container 10. Since there are no complex arrangements of components, designs, shapes, or edges, the costs of the molds, along with the costs of the manufacturing, are considerably reduced. The simple two-piece construction is not shown, nor described in the prior art previously.

Another advantage of the present invention is the fact that the bottom edge 20 of the angled side wall 16 of dish member 12 extends slightly outward beyond the rim 26 of the base member 14. As such, any overflow of the dish 22, or any messiness by the pet using the pet food container 10, will cause the food and liquid to flow over the exterior of the base member 14, rather than flowing into the water contained within moat 40. It has been found that, when food particles find their way onto the surface of the water within the moat 40, insect bridges can be built from these food particles. Also, the food residing within the water on the interior of base member 14 can serve to attract insects. As such, it has been found to be desirable to prevent food from entering into the interior of base member 14.

The inclusion of the window 36 solves a major problem of prior art devices. The window 26 can be used to see the level of the water within moat 40 and also can be used to allow the user to fill the moat 40 without moving the pet food container 10. A great deal of sloppiness, spillage, and other problems can result when it is necessary to move or disassemble the pet food container. To accommodate those problems, the window 36 was developed so as to simplify procedures. Also, the inclusion of the deflector 38 above the window 36 also assists in preventing the intrusion of food into the water contained within moat 40.

By the use of the configuration shown by the present invention, the dish member 12 has a greater diameter than the base member 14. As such, any condensation of the water from the moat 40 of base member 14 will accumulate on the interior of dish member 12. The condensation will then flow back into the moat 40 of the base member 14. As such, the water supply contained within the moat 40 of the base member 14 will last for a longer period of time and will not require refilling as it would if the moat were exposed to the open air.

By staking the base member 14 to the ground, through the use of the hole 61, the present invention is stabilized. As such, it becomes very difficult to tip the pet food container 10 over. It also becomes difficult to push the pet food container 10 next to something that can act as a bridge between the base member 14 and the dish member 12. In normal usage, dogs, and other pets, will have a tendency to push their food container next to a surface. By staking the base member 14 to the ground, the pet can no longer force the container 10 into a position that will allow ants, or other non-flying insects, to enter.

The foregoing disclosure and description of the invention is illustrative and explanatory thereof. Various changes in the details of the illustrated apparatus may be made within the scope of the appended claims without departing from the true spirit of the invention. The present invention should be limited by the following claims and their legal equivalents.

I claim:

1. A pet food container comprising:
   a dish member having an outwardly angled side wall, said dish member having a concavity formed at an upper surface, said dish member having a connector formed on a bottom surface on said concavity; and a base member having a generally flat bottom surface, said base member having a raised rim extending outwardly from an outer periphery of said bottom surface, said base member having a central member for engaging said connector of said dish member, said rim and said central member defining a liquid-receiving moat in said base member, said dish member positioned above said base member such that said angled side wall of said dish member is separated from said rim of said base member, said angled side wall having a window area formed therein, said window area for allowing a liquid to be passed to said moat of said base member, said window area having a thin strip extending along a bottom edge of said angled side wall, said window area having a ledge formed along a top edge of said window area, said ledge for deflecting material from entering said window area.

2. The container of claim 1, said angled side wall having a bottom edge of greater diameter than said rim of said base member.

3. The container of claim 1, said connector being a collar extending downwardly from said concavity of said dish member.

4. The container of claim 3, said central member of said base member having a support pipe extending upwardly from said base member, said support pipe slidingly engaging an inner surface of said collar of said dish member.

5. The container of claim 3, said collar and said dish member being integrally formed.

6. The container of claim 1, said base member and said central member being integrally formed together.

7. The container of claim 1, said dish member and said base member being of an injection-molded plastic material.

8. The container of claim 1, said angled side wall having a bottom edge separated from a top edge of said rim by a distance of one-half inch or greater.

9. The container of claim 4, said base member having a hole formed through said flat bottom surface, said hole for the receipt of a stake, said hole located interior of said support pipe.

10. A pet food container comprising:
a dish member having an outwardly angled side wall, said dish member having a concavity formed at an upper surface, said dish member having a connector formed on a bottom surface of said concavity; and
a base member having a generally flat bottom surface, said base member having a raised rim extending outwardly from an outer periphery of said bottom surface, said base member having a central member for engaging said connector of said dish member, said rim and said central member defining a liquid-receiving moat in said base member, said dish member positioned above said base member such that said angled side wall of said dish member is separated from said rim of said base member, said angled side wall having a window area formed therein, said window area for allowing a liquid to be passed to said moat of said base member, said window area having a slotted indented surface formed therein, said slotted indented surface having a roughly V-shaped configuration extending inwardly of said side wall.

11. A pet food container comprising:
a dish member having an outwardly angled side wall, said side wall having a window area formed therein, said dish member having a connector formed on a bottom surface; and
a base member having a generally flat bottom surface, said base member having a raised rim extending outwardly from an outer periphery of said bottom surface, said base member having a central member for engaging said connector of said dish member, said rim and said central member defining a liquid-receiving moat in said base member, said dish member positioned above said base member such that said angled side wall of said dish member is separated from said rim of said base member, said outwardly angled side wall having a diameter along a bottom edge greater than said rim, said window having a thin strip extending along said bottom edge, said thin strip for connecting sides of said window, said window having a generally semicircular configuration, a top edge of said window having a ledge formed thereon so as to deflect a liquid from entering said window.

12. The container of claim 11, said dish member having a concavity formed therein, said concavity for receiving a pet food, said connector integrally formed on a bottom surface of said concavity.

13. The container of claim 11, said angled side wall having a bottom edge separated from a top edge of said rim by a distance of one-half inch or greater, said base member having a hole formed through said bottom surface.

14. The container of claim 11, said dish member and said base member being of an injection-molded plastic material.

* * * * *